(12) United States Patent
Jodet et al.

(10) Patent No.: US 10,557,417 B2
(45) Date of Patent: Feb. 11, 2020

(54) ACOUSTIC ABSORBER CELL FOR A TURBOJET, AND AN ASSOCIATED ACOUSTIC TREATMENT PANEL

(71) Applicant: SAFRAN AIRCRAFT ENGINES, Paris (FR)

(72) Inventors: Norman Bruno Andre Jodet, Maisons-Alfort (FR); Jeremy Paul Francisco Gonzalez, La Chappelle Rablais (FR); Jacky Novi Mardjono, Nogent sur Marne (FR); Georges Jean Xavier Riou, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 119 days.

(21) Appl. No.: 15/963,416

(22) Filed: Apr. 26, 2018

(65) Prior Publication Data

US 2018/0313273 A1    Nov. 1, 2018

(30) Foreign Application Priority Data

Apr. 28, 2017    (FR) ...................................... 17 53785

(51) Int. Cl.
*F02C 7/24* (2006.01)
*B64D 27/16* (2006.01)

(52) U.S. Cl.
CPC ................ *F02C 7/24* (2013.01); *B64D 27/16* (2013.01); *F05D 2220/323* (2013.01); *F05D 2260/963* (2013.01)

(58) Field of Classification Search
CPC . F02K 1/827; F02C 7/045; F02C 7/24; G10K 11/172; B64D 27/16; F05D 2220/323; F05D 2260/963
See application file for complete search history.

(56) References Cited

U.S. PATENT DOCUMENTS 3,141,519 A * 7/1964 Bottum ................... F01N 1/165
 181/241
3,940,721 A * 2/1976 Kojima ................. H01J 23/207
 333/233

(Continued)

FOREIGN PATENT DOCUMENTS

EP    1 624 251 A1    2/2006
EP    2 397 761 A1    12/2011

(Continued)

OTHER PUBLICATIONS

French Preliminary Search Report dated Jan. 10, 2018 in French Application 17 53785 filed on Apr. 28, 2017 (with English Translation of Categories of Cited Documents).

*Primary Examiner* — Igor Kershteyn
(74) *Attorney, Agent, or Firm* — Oblon, McClelland, Maier & Neustadt, L.L.P.

(57) ABSTRACT

An acoustic absorber cell (1) for mounting on a turbojet wall in contact with a fluid flow, the cell (1) having a resonant cavity (2) presenting a wall (30) having at least one orifice (4) associated with a neck (5) having a tube (51) extending inside the resonant cavity (2) and projecting from the wall (30). The neck (5) also having a tubular ring (52) coaxial with the tube (51) and movable relative to the tube (51), and the cell (1) includes electromagnetic actuator (6) for moving the ring (52) along the tube (51), and controller (7) for controlling the electromagnetic actuator (6) and configured to control movement of the ring (52) along the tube (51) as a function of the operating speed of the turbojet between at least first and second positions defining respective first and second resonant frequencies of the resonant cavity (2).

15 Claims, 5 Drawing Sheets

(56) References Cited

U.S. PATENT DOCUMENTS

| | | | |
|---|---|---|---|
| 4,106,587 A | 8/1978 | Nash et al. | |
| 4,546,733 A * | 10/1985 | Fukami | F01N 1/006 123/184.57 |
| 5,475,189 A * | 12/1995 | Field | F16L 55/0333 181/241 |
| 5,930,371 A * | 7/1999 | Cheng | F01N 1/023 381/71.5 |
| 6,508,331 B1 * | 1/2003 | Stuart | F02M 35/125 123/184.57 |
| 6,698,390 B1 * | 3/2004 | Kostun | F02M 35/1222 123/184.57 |
| 6,732,510 B2 * | 5/2004 | Ciray | F01N 1/02 181/241 |
| 7,337,877 B2 * | 3/2008 | Goenka | F02M 35/1261 123/184.56 |
| 2005/0223707 A1 * | 10/2005 | Ikeda | F23R 3/04 60/725 |
| 2011/0308630 A1 * | 12/2011 | Huber | F23M 20/005 137/14 |
| 2015/0041248 A1 | 2/2015 | Ichihashi | |

FOREIGN PATENT DOCUMENTS

| | | |
|---|---|---|
| FR | 2 356 820 A1 | 1/1978 |
| KR | 10-2013-0060962 | 6/2013 |

* cited by examiner

ACOUSTIC ABSORBER CELL FOR A TURBOJET, AND AN ASSOCIATED ACOUSTIC TREATMENT PANEL

BACKGROUND OF THE INVENTION

The invention relates to acoustic propagation from propulsion systems making use of ducted turbine engines, and more particularly it relates to an acoustic treatment cell for use in making up an acoustic treatment panel in order to attenuate the noise radiated by interaction between a rotor and its environment.

Conventionally, acoustic treatment for a turbojet, and more particularly treatment of the noise radiated by interaction between the rotor and its environment, is performed by using absorber panels arranged at the wetted surfaces of the ducts in which the soundwaves propagate. The term "wetted surfaces" is used to mean the surfaces in contact with a fluid flow. Such panels are made of sandwich type composite materials holding captive a honeycomb having absorbent properties that are obtained in part on the principle of Helmholtz resonators.

A Helmholtz resonator is constituted by a resonant cavity and a neck extending into the inside of the cavity from an orifice formed in a wall and enabling the resonant cavity to communicate with the surrounding medium in which the waves for attenuation are propagating. The neck thus provides communication between the ambient medium and the internal air cavity. Once the device has been optimized, the neck gives rise to a visco-thermal dissipation effect, which corresponds to rapid and alternating movement of soundwaves through the ends of the neck, thereby giving rise to dissipation by friction.

In conventional treatment technologies, the length of the neck is short compared with the height of the cavity. More precisely, in conventional technologies, the length of the neck is equal to the thickness of a wall made of composite sheet material (carbon+resin) constituting the wetted surface of the treatment, with the neck being obtained merely by perforating that wall. The operation of the Helmholtz resonator is optimized by dimensioning the air cavity so as to obtain the acoustic speed maximum at the neck. This optimization requires cavity height to be of the order of one-fourth of the wavelength of the main frequency that is to be treated. It also provides very advantageous properties concerning the width of the frequency band that is covered.

Nevertheless, present trends in optimizing propulsion systems are oriented towards reducing the number of blades and reducing the speed of rotation of the fan. This implies that the fan and the associated outlet guide vanes (OGVs) radiate acoustically at a lower frequency. The term "fan-OGV" is used to designate a system combining a rotor and a stator in the bypass stream. The rotor is referred to as the "fan". The stator is made up of the outlet guide vanes. It would also be possible to use the term "rotor-stator". The fan-OGV acoustic radiation frequency corresponds to the frequency of the acoustic radiation generated by the interaction between the blades of the rotor and the vanes of the stator, and also by the rotor itself.

Optimizing treatment panels then requires their thickness to be increased in order to be able to increase the height of the cavities and thus lower the frequency to which the resonant cavities in the panels are tuned. This makes the panels incompatible with the weight and size constraints associated with new ultra-high bypass ratio (UHBR) type architectures.

Figure 1:
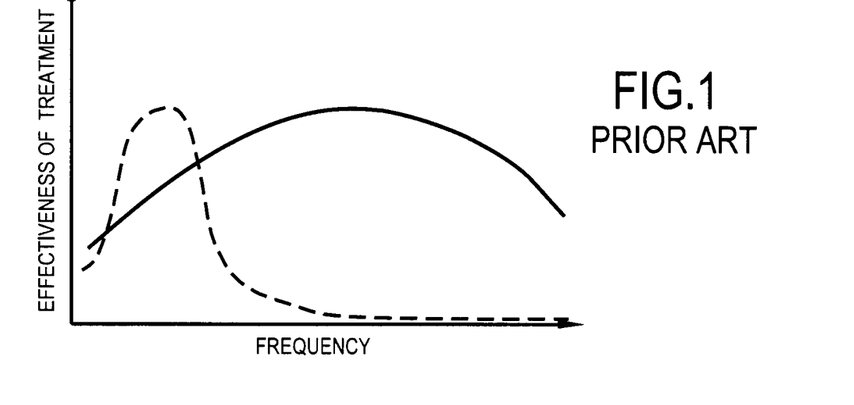
FIG. 1, described above, plots an acoustic attenuation curve showing the effectiveness of treatment as a function of the frequency of the soundwave for two different prior art cells.

It is still possible to dimension the Helmholtz resonator in such a manner that it is effective at lower frequencies, while occupying little space radially, e.g. by acting both on the height of the neck and on the volume of the resonant cavity. However, that type of dimensioning under the constraint of given small size, is achieved at the cost of the frequency band over which treatment is performed well being reduced drastically with decreasing frequency, as is shown in FIG. 1, which shows an acoustic attenuation curve plotting the effectiveness of treatment as a function of frequency for a conventional Helmholtz resonator as a continuous line and for a prior art Helmholtz resonator of dimensions that have been reduced as a dashed line.

Figure 2:
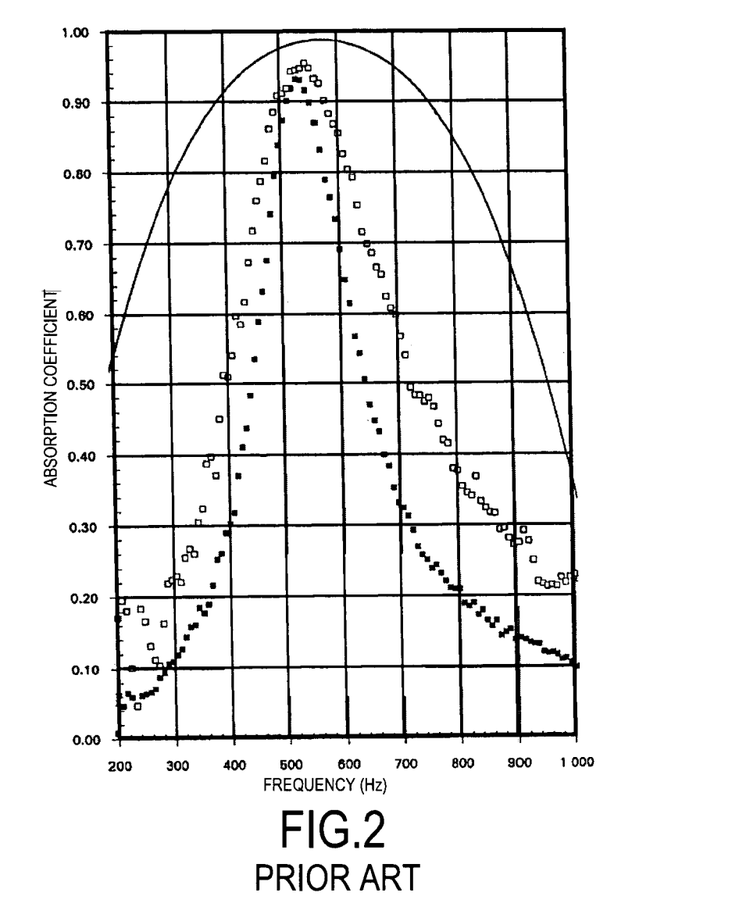
FIG. 2, described above, is a graph showing how the absorption coefficient varies as a function of the frequency of the soundwave for three different prior art cells.

FIG. 2 shows the results of measurements in the form of absorption coefficients concerning the low-frequency performance centered on 550 hertz (Hz) of a large neck structure having an overall thickness of 26 millimeters (mm) for a sound level of 140 decibels (dB), which measurements are plotted using white squares, and for a sound level of 156 dB, which measurements are plotted using black squares, in comparison with a conventional resonator based on a much thicker perforated sheet, plotted using a continuous line, which requires the use of a 150 mm cavity for performance that is equivalent in this frequency range.

This restriction concerning the width of the attenuation frequency band is very penalizing, since variation in the speed of the fan depending on the stage of flight gives rise to large changes in its sound emission frequency. As a result, acoustic treatment dimensioned in this way is effective at a single speed only.

OBJECT AND SUMMARY OF THE INVENTION

The invention seeks to provide a low-frequency resonator presenting a broad frequency band making it possible to have effective acoustic treatment at more than one operating speed of the turbojet, while retaining small dimensions for the resonator.

In one aspect, the invention provides an acoustic absorber cell for mounting on a wall of a turbojet in contact with a fluid flow, the cell comprising a resonant cavity presenting walls and at least one orifice associated with a neck having a tubular portion, said at least one orifice communicating with the outside medium in which the noise for attenuating propagates, and said tubular portion extending inside the resonant cavity and including, in an axial direction of the tubular portion orthogonal to a plane in which said orifice extends both a first end that is free, and also a second end that is secured at least to a wall around the orifice with which the tubular portion co-operates.

According to a general characteristic of the invention, the neck further comprises a tubular ring coaxial with the tubular portion, and movable relative to said tubular portion, and the cell has translation means for moving the ring along the tubular portion in order to modify the length of the neck, and control means for controlling the translation means and configured to control the movement of the ring along the tubular portion as a function of the operating speed of the turbojet, at least between first and second positions corresponding respectively to first and second resonant frequencies of the resonant cavity.

The cell of the invention thus makes it possible to attenuate the radiation associated with the low-frequency noise in a manner that is effective at at least two distinct speeds of fan rotation, and for a size that is small compared with conventional honeycomb type treatment. In particular, the cell of the invention makes it possible to vary the tuned frequency of the acoustic treatment so as to optimize the attenuation of noise from the fan around at least two known operating speeds of the engine, such as for example two speeds of rotation of the fan during takeoff. The frequencies for treatment during takeoff are lower than 1000 Hz.

The term "tube" is used to designate a hollow article that is longer than it is wide and that is cylindrical in appearance. The term "tubular portion" is thus used to mean a portion that is in the shape of a tube, i.e. presenting a hollow shape of cylindrical appearance.

In addition, the term "cylinder", and correspondingly a shape that is "cylindrical", designates a ruled surface having generator lines that are parallel, i.e. a surface in three-dimensional space made up of parallel straight lines. The shape of the base of the tube may be arbitrary, such as for example a circle, an ellipse, a hexagon, or a quadrilateral.

In a first embodiment of the acoustic absorber cell, the ring may comprise at least a portion made of ferromagnetic material, and the translation means may comprise an electromagnetic actuator configured to deliver an electromagnetic field serving to attract the ring into one of the first and second positions, and to repel the ring into the other position.

The use of an electromagnetic actuator co-operating with a ferromagnetic portion of the ring enables the actuator to be mounted equally well inside or outside the cell, there being no need for the actuator to have a mechanical connection with the ring in order to move it.

The ferromagnetic portion may be a portion of the ring or it may be the entire ring, or indeed it may be a ferromagnetic portion fitted onto the ring.

Preferably, in order to lighten the ring, and thus the cell, the ferromagnetic portion may be arranged on a portion of the ring that is closest to the electromagnetic actuator. Not only does that make it possible to reduce the weight of the ring and thus the weight of the cell, but it also makes it possible to reduce the power needed by the electromagnetic actuator and thus potentially to reduce its size and weight.

In a second embodiment of the acoustic absorber cell, the ring is preferably made of stainless material.

The ring must be made of a material that withstands water and it should preferably be stainless since the cell is to be mounted on a wetted wall, i.e. a wall that is in contact with a fluid flow that may convey particles of water that could oxidize the ring and thus accelerate wear of the ring and thus of the cell.

In a third embodiment of the acoustic absorber cell, the cell may also include a first abutment arranged to block the ring along said axial direction in said first position, and a second abutment arranged to block the ring along said axial direction in said second position, the ring sliding between the first abutment and the second abutment along the tubular portion in the axial direction.

The first and second abutments provide simple means for setting the length of the neck between respective first and second resonant frequencies as a function of the operating speed of the turbojet.

In a fourth embodiment of the acoustic absorber cell, the ring may comprise, along said axial direction, both a first tubular portion that is acoustically opaque, and also a second tubular portion that is acoustically porous, the first portion of the ring extending along the axial direction from the first end of the ring facing the orifice, and the second portion of the ring extending along the axial direction from a second end of the ring, opposite from said first end of the ring, and the first portion of the ring extending along the axial direction over a length that is shorter than or equal to the length of the tubular portion along said axial direction, the first abutment being formed by the wall having the orifice, and the second abutment being formed by a wall that faces the wall having the orifice in said axial direction, the total length of the ring being longer than the distance between said first end of the tubular portion and the second abutment.

The term "acoustically opaque" is used to mean a material through which a soundwave cannot pass or that presents a low transmission coefficient. An acoustically opaque tubular portion thus makes it possible to convey without loss a soundwave of wavelength that corresponds to the length of the acoustically opaque tubular portion. In contrast, the term "acoustically porous" is used to mean a material through which a soundwave can pass.

The length of the tubular portion defines the first resonant wavelength that corresponds to the first treatment resonant frequency of the resonant cavity. The second tuned frequency of the resonant is defined by the second treatment resonant wavelength of the resonant cavity, which corresponds to the sum of the length of the tubular portion in the axial direction plus the length of the opaque portion of the ring projecting beyond the tubular portion when the ring is bearing against the second abutment, i.e. when the end of the ring from which the porous portion of the ring extends is in contact with the wall opposite from the wall to which the tubular portion is fastened.

Specifically, in a second configuration, the electromagnetic system actuates movement of the ring so that it occupies the first position in which the first end of the ring is in abutment against the wall having the orifice. In this first configuration, the height of the neck, which defines the treatment wavelength of the resonant cavity, corresponds to the height of the tubular portion.

In a second configuration, the electromagnetic system causes the ring to move so that it occupies the second position in which the second end of the ring, from which the acoustically porous second portion extends, is in abutment against the top wall of the cavity, i.e. the wall facing the wall having the orifice. In this second configuration, the height of the neck corresponds to the difference between the height of the cavity and the length of the porous second portion of the ring. This height of the neck is greater than the height of the neck in the first configuration. Consequently, the cell is tuned to a longer wavelength, and thus to a lower frequency.

In a fifth embodiment of the acoustic absorber cell, the ring comprises a first end along the axial direction facing a wall having the orifice and a second end opposite from the first end, said first end of the tubular portion having an annular shoulder extending radially in a first radial direction, i.e. towards the ring, and the first end of the ring having a complementary annular shoulder extending radially in a second radial direction opposite to the first radial direction, and thus towards the tube, and co-operating with the first annular shoulder of the first end of the tubular portion to form the second abutment, the first abutment comprising said wall having the orifice.

This embodiment of the acoustic absorber cell presents parts that are more compact, in particular a ring that is more compact, thereby potentially making it possible to reduce the size and the weight of the cell. In addition, the ring is of simplified design, with it being possible to use a single uniform material for the entire ring.

In a sixth embodiment of the acoustic absorber cell, the second abutment may comprise a porous partition extending inside the resonant cavity between the free first end of the tubular portion and a wall facing the wall having the orifice, the porous partition extending in a plane that is orthogonal to said axial direction in which the tubular portion extends, the total length of the ring along the axial direction being shorter than the length of the tubular portion along the axial direction and longer than the distance between the free first end of the tubular portion and the porous partition.

This embodiment is simpler in design for the tubular portion and for the ring.

In a seventh embodiment of the acoustic absorber cell, regardless of the position of the ring, the neck has an acoustic length defined by the length along the axial direction over which the neck has an acoustically opaque portion extending from a first end secured to the wall having the orifice to a second end opposite from the first end along the axial direction, the distance between the second end of the opaque portion and the wall facing the wall having the orifice being greater than one-fourth of the length of the neck.

This constraint relating to the acoustic length makes it possible to guarantee the behavior of the resonant cavity. Specifically, it acts like a spring working in tune with the air contained in the neck. If the end of the neck is too close to a wall, such operation might be disturbed.

In an eighth embodiment of the acoustic absorber cell, the resonant cavity has a wall with a plurality of orifices, each associated with a respective neck having a tubular portion and a slidable ring, the spacing between each neck in a direction orthogonal to said axial direction being greater than a neck diameter.

Having a plurality of necks associated with a plurality of orifices in a single cell serves to make the acoustic characteristics of the walls more uniform.

In all embodiments, the tuned frequency of the cell is given by the following equation:

$$\text{Tuned frequency} = \frac{C}{2\pi}\sqrt{\frac{S}{Vl'}}$$

where C is the speed of sound, S is the section of the neck, V is the volume of the resonant cavity, $\lambda'$ is the corrected length of the neck, where $\lambda' = \lambda + \delta$ with $\lambda$ being the geometrical length of the neck, and $\delta$ being the neck correction, $\delta$ being determined using the following equation for juxtaposed resonators:

$$\delta = 1.7r(1-0.7\sqrt{\sigma})$$

where r is the radius of the orifice, and $\sigma$ is the perforation fraction.

In a ninth embodiment of the acoustic absorber cell, the cell may further comprise a covering that is aerodynamic and acoustically very porous and that is mounted over the orifice outside the resonant cavity.

In particular when the diameter of the neck is large, e.g. greater than 1.8 mm, such a covering enables the aerodynamic surface of the flow passage of the turbojet to be reconstituted without opposing resistance to the propagation of soundwaves.

The aerodynamic and acoustically very porous covering may be formed by a perforated sheet or by a fabric that is acoustically very porous.

In a tenth embodiment of the acoustic absorber cell, the translation means are mounted inside the resonant cavity.

Positioning the translation means inside the resonant cavity serves to maximize the volume of the resonant cavity and thus reduce the overall size of the cell.

In a variant, the translation means are mounted outside the resonant cavity.

Positioning the translation means outside the resonant cavity facilitates fabrication of the cell, in particular by avoiding the need to create passages for wires powering the translation means inside the resonant cavity.

The invention also provides an acoustic treatment panel for arranging on at least one wall of a turbojet in contact with a fluid flow, the panel being characterized in that it comprises a plurality of juxtaposed acoustic absorber cells as defined above.

The invention also provides a turbojet including at least one acoustic treatment panel as defined above.

The invention also provides an aircraft including at least one turbojet as defined above.

BRIEF DESCRIPTION OF THE DRAWINGS

The invention can be better understood on reading the following description given by way of non-limiting indication and with reference to the accompanying drawings, in which.

DETAILED DESCRIPTION OF EMBODIMENTS

Figure 3A:
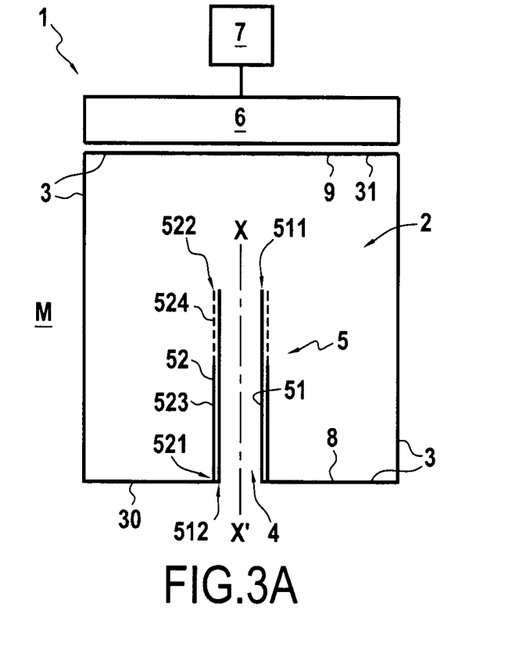
FIGS. 3A and 3B are diagrammatic section views of an example of an acoustic absorber cell in a first embodiment of the invention, shown respectively in a first position and in a second position.
Figure 3B:
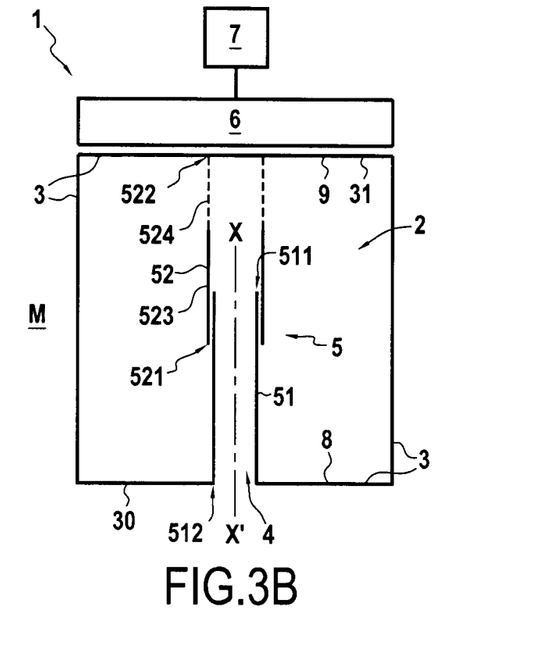

FIGS. 3A and 3B are diagrammatic section views of an acoustic absorber cell in a first embodiment of the invention, shown respectively in a first position and in a second position.

The acoustic absorber cell 1 comprises a resonant cavity 2 in the form of a rectangular parallelepiped having six walls 3. One of the six walls 3 has an orifice 4 communicating with the outside medium M in which the soundwaves for attenuation propagate. The wall 3 that includes the orifice 4 is referenced 30 and is referred to below as the perforated wall.

The cell 1 also includes a neck 5 comprising a tube 51 and a ring 52, an electromagnetic actuator 6, and control means 7 for controlling the electromagnetic actuator.

The tube 51 co-operates with the orifice 4 and extends inside the resonant cavity 2, projecting from the perforated wall 30 orthogonally relative to the plane in which the perforated wall 30 extends. The tube 51 possesses an axis of revolution X-X that is referred to below as the axial direction of the tube. The axis of revolution X-X extends orthogonally to the plane in which the perforated wall 30 extends. The tube 51 has a first end 511 that is free and a second end 512 that is secured to the perforated wall 30 at the circumference of the orifice 4.

The ring 52 is tubular in shape and is coaxial around the tube 51. In the first embodiment shown in FIGS. 3A and 3B, the ring 52 is larger in diameter than the tube 51 such that the tube 51 lies inside the ring 52. The ring 52 is movable relative to the tube 51 and can slide axially along the tube 51 in the axial direction X-X'.

In the axial direction X-X', the ring 52 has a first end 521 facing the perforated wall 30, and a second end 522 remote from the first end 521 and facing the wall that faces the perforated wall 30 in the axial direction X-X', which wall is referenced 31 and is referred in the description below as the "top" wall 31.

In the first embodiment shown in FIGS. 3A and 3B, the ring 52 also has a first tubular portion 523 that is acoustically opaque and a second tubular portion 524 that is acoustically porous, being made of ferromagnetic material so as to be sensitive to the magnetic field produced by the electromagnetic actuator 6. The first portion 523 of the ring 52 extends along the axial direction X-X' between the first end 521 and the second portion 524, and the second portion 524 of the ring 52 extends along the axial direction X-X' between the second end 522 and the first portion 523.

The cell 1 also has a first abutment 8 and a second abutment 9.

The first abutment 8 is formed by the perforated wall 30. Thus, when the ring 52 is moved along the tube 51 in the axial direction X-X' towards the perforated wall 30, the ring 52 is blocked at the end of its neck in a first position when the first end 521 of the ring 52 comes to bear against the first abutment 8, which is formed by the perforated wall 30.

The first portion 523 of the ring 52 extends along the axial direction X-X' over a length that is shorter than or equal to the length of the tube 51. Thus, when the ring 52 is in the first position, the cell 1 is tuned to a first resonant frequency that is defined solely by the length of the tube 51. The acoustic length of the neck 5 is then defined by the length of the tube 51 in the axial direction X-X'.

In the first embodiment shown in FIGS. 3A and 3B, the second abutment 9 is formed by the top wall 31. The total length of the ring 52 is longer than the distance between the free first end 511 of the tube 51 and the top wall 31. Thus, when the ring 52 is moved along the tube 51 along the axial direction X-X' towards the top wall 31, the ring 52 is blocked at the end of its stroke in a second position when the second end 522 of the ring 52 comes to bear against the second abutment 9 formed by the top wall 31. When the ring 52 is in the second position, the cell 1 is tuned to a second resonant frequency defined by the sum of the length of the tube 51 plus the length of the first portion 523 of the ring that projects beyond the first end 511 of the tube 51 towards the top wall 31. In other words, this length, which corresponds to the acoustic length of the neck 5 for the second position of the ring 52 corresponds to the difference between the distance between the perforated wall 30 and the top wall 31 and the length of the acoustically porous second portion 523 of the ring 52.

In order for the ring 52 to interact with the electromagnetic field of the electromagnetic actuator 6, the ring 52 is made of ferromagnetic material. The ferromagnetic material is also stainless so as to avoid wear on contact with water particles.

In a variant, only a portion of the second end 522 of the ring 52 need be made of ferromagnetic material.

In the first embodiment of FIGS. 3A and 3B, the electromagnetic actuator 6 is mounted outside the resonant cavity 2 against the top wall 31. The electromagnetic actuator 6 is configured to move the ring 52 along the tube 51 between the first and second positions in order to modify the acoustic length of the neck 5.

More precisely, in a first mode of operation configured to tune the cell 1 on a first frequency, the electromagnetic actuator 6 pushes the ring 52 electromagnetically until it comes into abutment against the first abutment 8 formed by the perforated wall 30, as shown in FIG. 3A. In a second mode of operation configured to tune the cell 1 on the second frequency, the electromagnetic actuator 6 attracts the ring 52 electromagnetically until it comes into abutment against the second abutment 9 formed by the top wall 31.

The control means 7 are coupled to the electromagnetic actuator 6 and they are configured to control the electromagnetic actuator 6 so as to move the ring 52 along the tube 51 between the first and second positions, as a function of the operating speed of the turbojet.

Figure 4A:
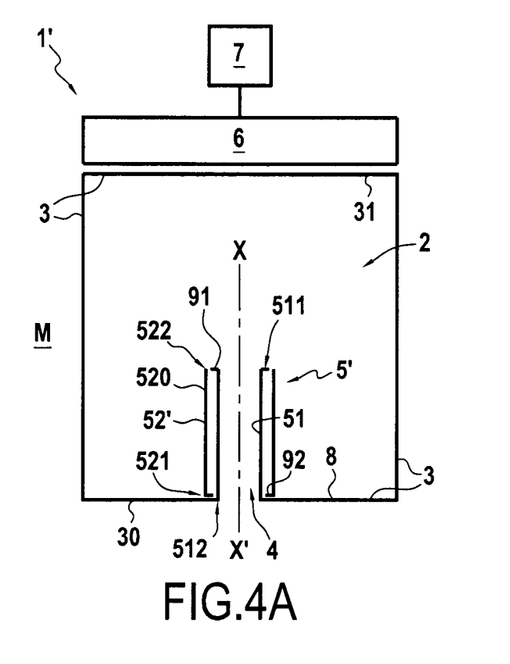
FIGS. 4A and 4B are diagrammatic section views of an example of an acoustic absorber cell in a second embodiment of the invention, shown respectively in a first position and in a second position.
Figure 4B:
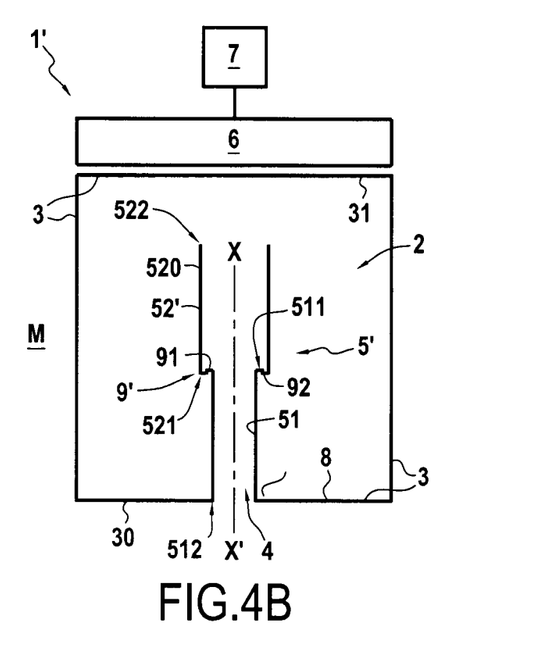

FIGS. 4A and 4B are diagrammatic section views of an acoustic absorber cell in a second embodiment of the invention, shown respectively in a first position and in a second position.

Elements identical to the first embodiment are given the same numerical references.

The cell 1' of the second embodiment shown in FIGS. 4A and 4B differs from the cell 1 of the first embodiment shown in FIGS. 3A and 3B in terms of the second abutment 9' and the ring 52'.

The ring 52' comprises a single portion 520 made of material that is acoustically opaque and ferromagnetic, such as stainless steel, and it is of length shorter than the length of the tube 51.

The first end 511 of the tube 51 has an annular shoulder 91 extending radially outwards from the tube 51, i.e. towards the ring 52', and the first end 521 of the ring 52' has a complementary annular shoulder 92 extending radially inwards from the ring 52', i.e. towards the tube 51. The first annular shoulder 91 of the tube 51 co-operates with the complementary annular shoulder 92 of the ring 52' in order to form the second abutment 9' when the ring 52' is attracted by the electromagnetic actuator 6 in order to occupy the second position, thereby tuning the cell 1' on the second resonant frequency.

In the second position, the acoustic length of the neck 5 corresponds to the sum of the length of the tube 51 plus the length of the ring 52' projecting beyond the first end 511 of the tube 51 when the ring 52' is in the second position. It corresponds to the difference between the distance between the perforated wall 30 and the top wall 31, and the distance between the second end 522 of the ring 52' and the perforated wall 30 when the ring 52' is in the second position.

Figure 4C:
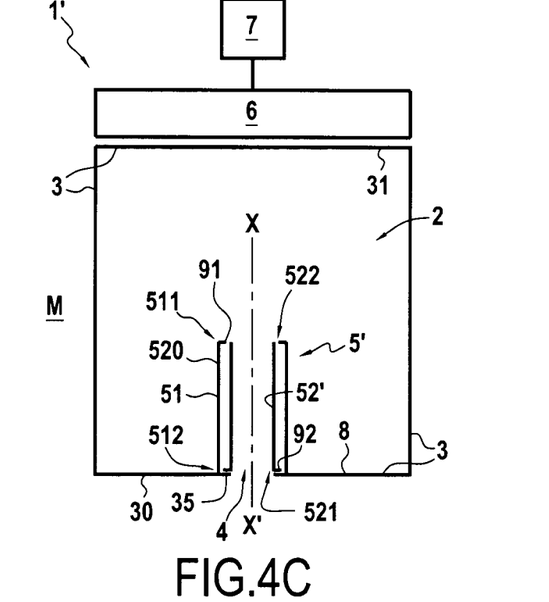
FIG. 4C is a diagrammatic section view of a variant example of an acoustic absorber cell in the second embodiment of the invention.

FIG. 4C is a diagrammatic view of a variant example of an acoustic absorber cell in the second embodiment as shown in FIGS. 4A and 4B.

In this variant, the tube 51 has a diameter that is greater than the diameter of the ring 52' such that the ring 52' is engaged inside the tube 51. The first end 511 of the tube 51 has an annular shoulder 91 extending radially towards the inside of the tube 51, i.e. towards the ring 52', and the first end 521 of the ring 52' has a complementary annular shoulder 92 extending radially towards the outside of the ring 52', i.e. towards the tube 51.

The first abutment 8 is formed by a portion of the wall 30 projecting radially inwards beyond the tube 51 so as to form a shoulder for supporting the ring 52 in the first position.

Figure 5A:
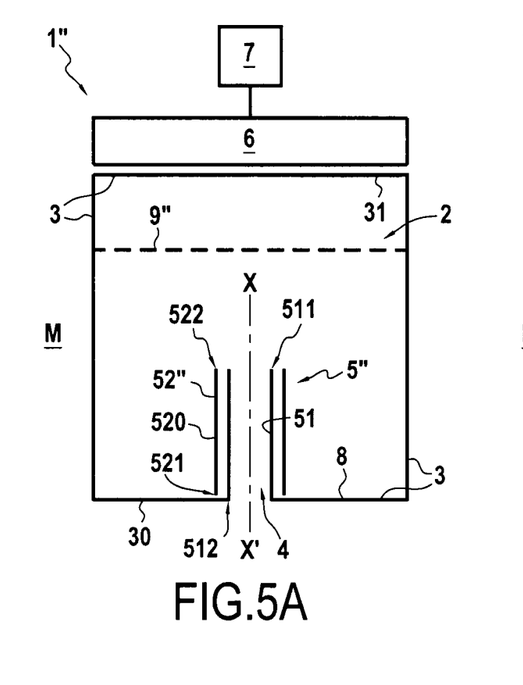
FIGS. 5A and 5B are diagrammatic section views of an example of an acoustic absorber cell in a third embodiment of the invention, shown respectively in a first position and in a second position.
Figure 5B:
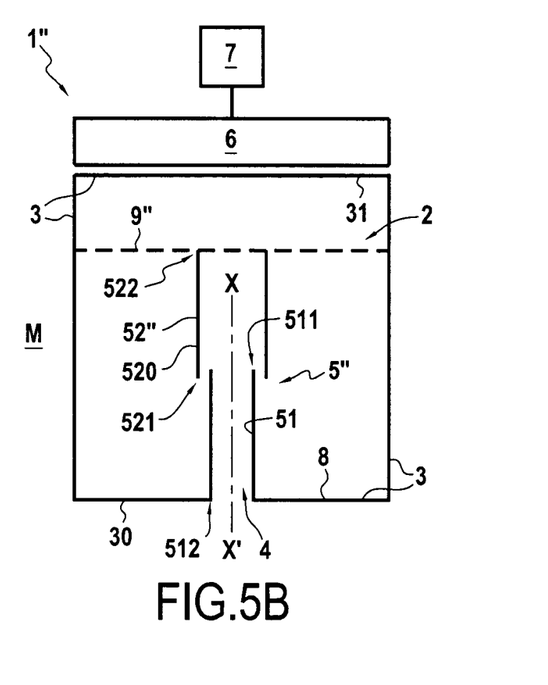

FIGS. 5A and 5B are diagrammatic section views of an acoustic absorber cell in a third embodiment of the invention shown respectively in a first position and in a second position.

Elements identical to the first embodiment are given the same numerical references.

The cell 1" of the third embodiment shown in FIGS. 5A and 5B differs from the cell 1 of the first embodiment shown in FIGS. 3A and 3B in terms of the second abutment 9" and the ring 52".

The ring 52" comprises a single portion 520 of material that is acoustically opaque and ferromagnetic, and of length shorter than the length of the tube 51, as in the second embodiment. In contrast, unlike the second embodiment, it does not have an annular shoulder.

The cell 1" has an acoustically porous partition 9" forming the second abutment.

The porous partition 9" extends inside the resonant cavity 2 between the free first end 511 of the tube 51 and the top wall 31. The porous partition 9" extends parallel to the perforated wall 30 and to the top wall 31, i.e. in a plane that is orthogonal to the axial direction X-X'. The distance between the first end 511 of the tube 51 and the porous partition 9" is shorter than the length of the ring 52".

In the second particular, the acoustic length of the neck 5 corresponds to the sum of the length of the tube 51 plus the length of the ring 52" projecting beyond the first end 511 of the tube 51 when the ring 52" is in the second position. It corresponds to the difference between the distance between the perforated wall 50 and the top wall 31 and the distance between the porous partition 9" and the top wall 31.

Figure 6A:
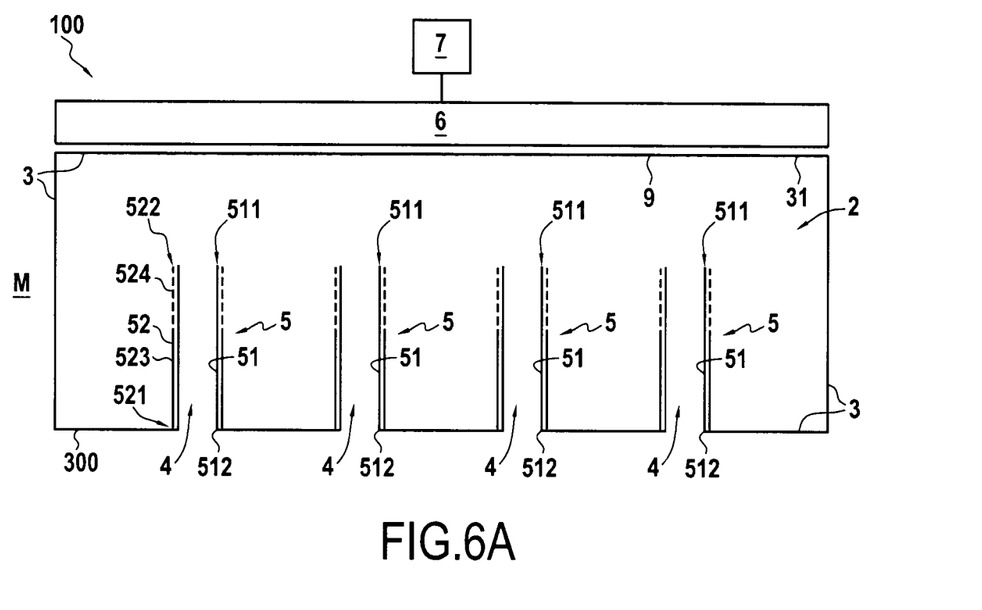
FIGS. 6A and 6B are diagrammatic section views of an example of an acoustic absorber cell in a fourth embodiment of the invention, shown respectively in a first position and in a second position.
Figure 6B:
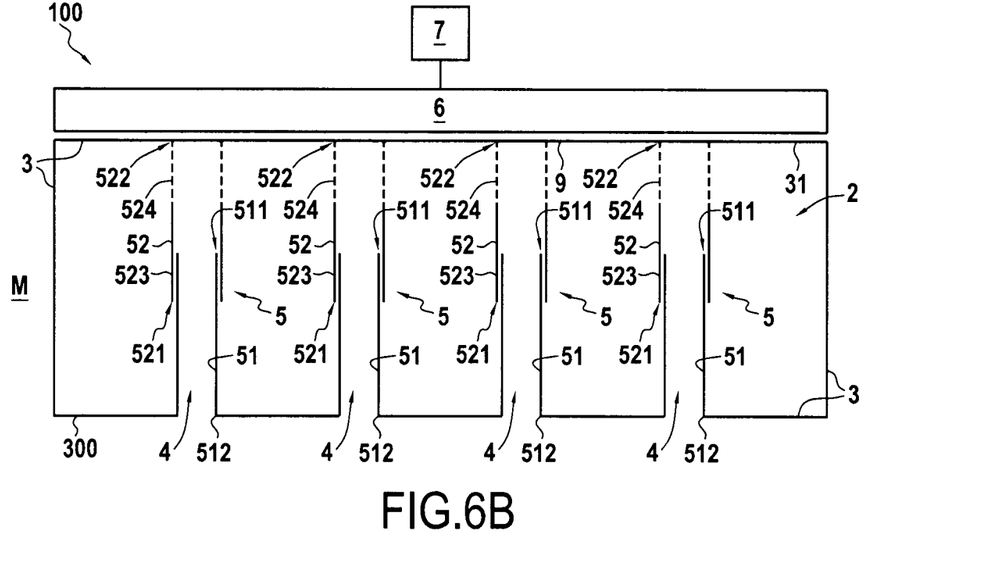

FIGS. 6A and 6B are diagrammatic section views of an acoustic absorber cell in a fourth embodiment of the invention, shown respectively in a first position and in a second position.

Elements identical to the first embodiment are given the same numerical references.

The cell 100 of the fourth embodiment differs from the cell 1 of the first embodiment shown in FIGS. 3A and 3B in that it does not have one orifice 4 associated with one neck 5, but rather it has four orifices 4 made in the wall 300, each associated with a respective neck 5, each of the necks 5 being made in the same manner as in the first embodiment.

Figure 7:
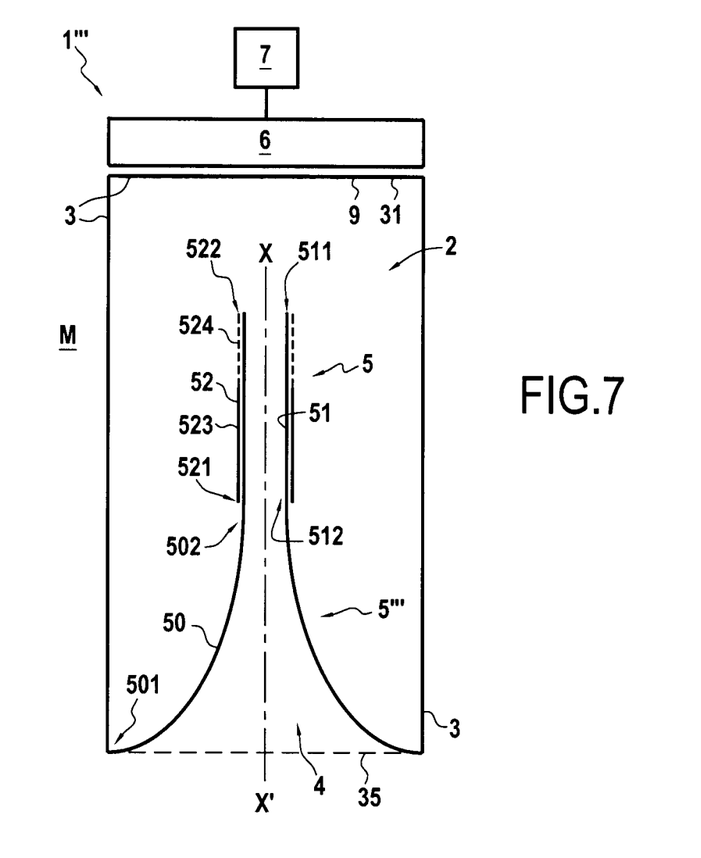
FIG. 7 is a diagrammatic section view of an example of an acoustic absorber cell in a fifth embodiment of the invention.

FIG. 7 is a diagrammatic section view of an example of an acoustic absorber cell in a fifth embodiment of the invention.

Elements identical to the first embodiment are given the same numerical references.

The cell 1'" of the fifth embodiment differs from the cell 1 of the first embodiment shown in FIGS. 3A and 3B in that the neck 5'" has a frustoconical portion 50 and a tubular portion 51.

The frustoconical portion 50 extends between the orifice 4 and the tubular portion 51. The orifice 4 extends over the entire width of the resonant cavity 2. The frustoconical portion 50 has a first end 501 with its periphery secured to the side wall 3 of the resonant cavity 2, and a second end 502 secured to the second end 512 of the tubular portion 51. Alternatively, in an embodiment that is not shown, the frustoconical portion 50 extends between the perforated wall 30 and the tubular portion 51. Under such circumstances, the orifice 4 thus does not occupy the entire width of the resonant cavity 2. At its first end 501, the frustoconical portion 50 is connected to the perforated wall 30 at the outline of the orifice 4. At its second end 502, the frustoconical portion 50 is connected to the second end 512 of the tubular portion 51.

The resonant cavity 2 also has a perforated sheet 35 mounted over the orifice 4 and fastened to the side walls 3.

The acoustic absorber cell 1'" behaves as in the first embodiment, with the tubular ring 52 sliding along the tubular portion 51, the tubular portion 51 acting as the tube 51 of the first embodiment and the first abutment 8 being formed by the flare of the frustoconical portion 51 or by an annular bead arranged around the second end 512 of the tubular portion 51.

Figure 8:
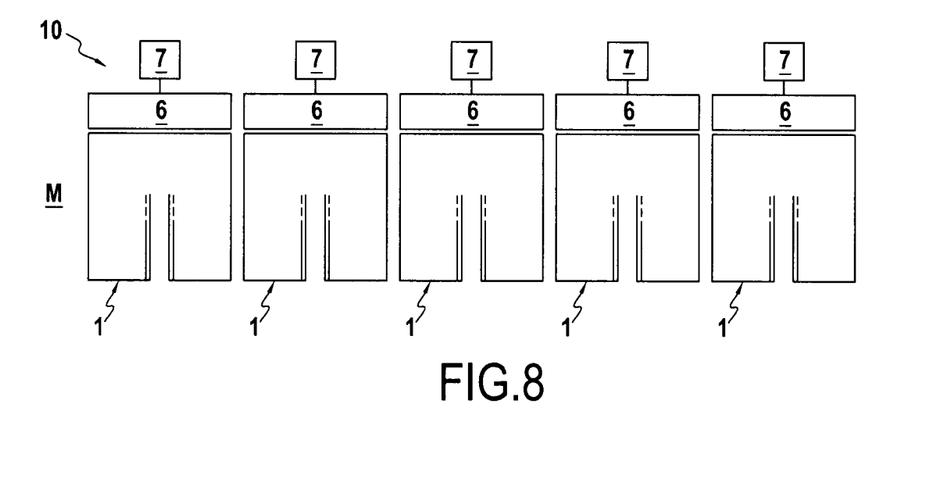
FIG. 8 is a diagram showing an example of an acoustic treatment panel comprising a plurality of FIG. 1 cells.

FIG. 8 is a diagrammatic section view of an acoustic treatment panel 10 comprising a juxtaposition of a plurality of acoustic absorber cells 1 of the first embodiment.

In the embodiment of the panel 10 shown in FIG. 8, each cell 1 has control means 7 for controlling the electromagnetic actuator 6 of the cell 1, each control means 7 being distinct from the control means of any other cell.

In a variant, the panel 10 may have a common control unit for all of the cells. The control means 7 of each cell 1 are replaced by a single control unit for controlling the electromagnetic actuators 6 of each of the cells 1.

The invention thus provides an acoustic treatment panel having a low-frequency resonator presenting a frequency band that is broad and modifiable, i.e. having a resonant frequency that can be modified, thus making it possible to obtain effective treatment at more than one operating speed of the turbojet, while retaining small dimensions for the resonator.

The invention claimed is:

1. An acoustic absorber cell for mounting on a wall of a turbojet in contact with a fluid flow, the cell comprising a resonant cavity presenting walls and at least one orifice associated with a neck having a tubular portion, said at least one orifice communicating with the outside medium (M) in which the noise for attenuating propagates, and said tubular portion extending inside the resonant cavity and including, in an axial direction of the tubular portion orthogonal to a plane in which said orifice extends both a first end that is free, and also a second end that is secured at least to a wall around the orifice with which the tubular portion co-operates, the acoustic absorber cell being characterized in that the neck further comprises a tubular ring coaxial with the tubular portion, and movable relative to said tubular portion, and the cell has translation means for moving the ring along the tubular portion in order to modify the length of the neck, and control means for controlling the translation means and configured to control the movement of the ring along the tubular portion as a function of the operating speed of the turbojet, at least between first and second positions corresponding respectively to first and second resonant frequencies of the resonant cavity.

2. A cell according to claim 1, wherein the ring comprises at least a portion made of ferromagnetic material, and the translation means comprise an electromagnetic actuator configured to deliver an electromagnetic field serving to attract the ring into one of the first and second positions, and to repel the ring into the other position.

3. A cell according to claim 1, wherein the ring is made of stainless material.

4. A cell according to claim 1, also including a first abutment arranged to block the ring along said axial direction in said first position, and a second abutment arranged to block the ring along said axial direction in said second position, the ring sliding between the first and second abutments along the axial direction.

5. A cell according to claim 4, wherein the ring comprises, along said axial direction, both a first tubular portion that is acoustically opaque, and also a second tubular portion that is acoustically porous, the first portion of the ring extending along the axial direction from the first end of the ring facing the orifice, and the second portion of the ring extending along the axial direction from a second end of the ring, opposite from said first end of the ring, and the first portion of the ring extending along the axial direction over a length that is shorter than or equal to the length of the tubular portion along said axial direction, the first abutment being formed by a wall having the orifice, and the second abutment being formed by a wall that faces the wall having the orifice in said axial direction, the total length of the ring being longer than the distance between said first end of the tubular portion and the second abutment.

6. A cell according to claim 4, wherein the ring comprises a first end along the axial direction facing a wall having the orifice and a second end opposite from the first end, said first end of the tubular portion having an annular shoulder extending radially in a first radial direction, and the first end of the ring having a complementary annular shoulder extending radially in a second radial direction opposite to the first radial direction and co-operating with said first annular shoulder to form the second abutment, the first abutment comprising said wall having the orifice.

7. A cell according to claim 4, wherein the second abutment comprises a porous partition extending inside the resonant cavity between the first end of the tubular portion and a wall facing the wall having the orifice, the porous partition extending in a plane that is orthogonal to said axial direction in which the tubular portion extends, the total length of the ring along the axial direction being shorter than the length of the tubular portion along the axial direction and longer than the distance between the first end of the tubular portion and the porous partition.

8. A cell according to claim 1, wherein, regardless of the position of the ring, the neck has an acoustic length defined by the length along the axial direction over which the neck has an acoustically opaque portion extending from a first end secured to the wall having the orifice to a second end opposite from the first end along the axial direction, the distance between the second end of the opaque portion and the wall facing the wall having the orifice being greater than one-fourth of the length of the neck.

9. A cell according to claim 1, wherein the resonant cavity has a wall with a plurality of orifices, each associated with a respective neck having a tubular portion and a slidable ring, the spacing between each neck in a direction orthogonal to said axial direction being greater than a neck diameter.

10. A cell according to claim 1, further comprising a covering that is aerodynamic and acoustically very porous, and that is mounted over said at least one orifice outside the resonant cavity.

11. A cell according to claim 1, wherein the translation means are mounted inside the resonant cavity.

12. A cell according to claim 1, wherein the translation means are mounted outside the resonant cavity.

13. An acoustic treatment panel for arranging on at least one wall of a turbojet in contact with a fluid flow, the panel being characterized in that it comprises a plurality of juxtaposed acoustic absorber cells according to claim 1.

14. A turbojet including at least one acoustic treatment panel according to claim 13.

15. An aircraft including at least one turbojet according to claim 14.

* * * * *